Patented Apr. 27, 1954

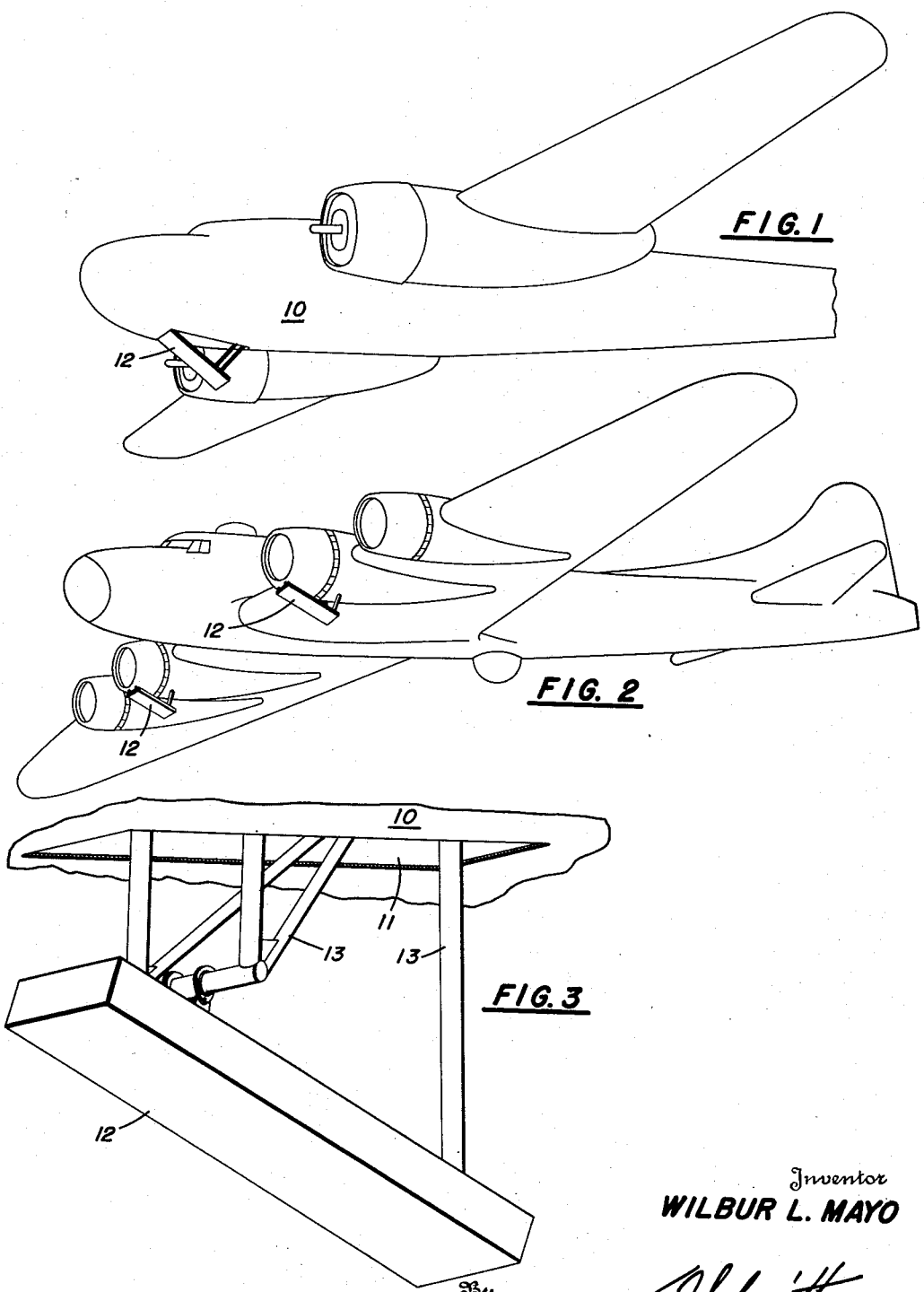

2,676,771

UNITED STATES PATENT OFFICE 2,676,771

HYDROFLAP

Wilbur L. Mayo, Hilton Village, Va.

Application March 30, 1951, Serial No. 218,508

3 Claims. (Cl. 244—105)

(Granted under Title 35, U. S. Code (1952), sec. 266)

This invention relates to seaplanes and other airplanes capable of safely landing in the sea. Airplanes capable of safe landing in the sea are generally capable of take-off from the sea if the required thrust is provided. Details of means for providing such thrust under the required operating conditions are not considered to be pertinent to the present invention, and are not required for certain types of operation in which the airplane is discarded after landing in the sea, or is retrieved and take-off accomplished from land or shipboard facilities. This is a continuation in part of my copending application Serial No. 72,461 filed January 24, 1949, now abandoned.

The principal object of the invention is the provision of a hull, or fuselage, having a streamlined configuration so as to reduce air resistance to a minimum, and provided with a substantially non-buoyant hydrodynamic lifting surface located beneath the streamlined hull, or fuselage, so as to prevent unfavorable forces and moments which would occur for the streamlined hull, or fuselage, alone. In the interest of obtaining maximum reduction in air resistance, the lifting surface may be retracted into the streamlined hull, or fuselage, during flight.

The nature of the present invention in comparison with the float type seaplane is that the bouyancy function is performed by the fuselage, thereby permitting the lifting surface beneath the fuselage to be much smaller than the seaplane float, which is required to supply full buoyancy in addition to hydrodynamic lift. This advantage in size is particularly great in comparison with retractable float seaplanes, since the volume required to float an airplane is large enough in comparison with the volume of the fuselage to make retraction extremely difficult. Collapsible sides between the lifting surface and the fuselage, for example, as proposed by White in British Patent 132,878 reduce this difficulty, but the large volume to be enclosed if buoyancy external to the fuselage is to have any significant effect, and the difficulty of providing collapsible sides which will withstand water loads due to yaw, drift, and turning, cause such a scheme to be impractical. The value of the present invention lies in the fact that any means for providing buoyancy external to that of the fuselage involves serious penalty. The invention is based on origination (and proof through dynamic model tests) of the idea that it is not necessary to provide flotation external to that provided by the fuselage, or to compromise the shape of a streamlined fuselage when lack of external flotation causes it to become partly submerged.

The nature of the present invention in comparison with the hull-type seaplane is that steps and chines are eliminated, thus permitting the shape to be streamlined and the air resistance to be low. Retractable hydrodynamic lifting surfaces proposed by Parker (U. S. Patent 2,347,841) eliminate air drag of the step in flight, but do not eliminate the chines. The fact that such lifting surfaces could be used to obtain favorable fuselage cross-sections was not appreciated by Parker.

The advantage of streamlined cross-sections was appreciated by Diehl in his proposal (U. S. Patent 2,255,046) for a streamlined wing tip float with a substantially non-buoyant lifting surface beneath it. There is indication that Diehl realized that streamlining a float would result in serious lift deficiency, and that a separate lifting surface would provide a practical means of overcoming this deficiency. The fact that Diehl's proposal was limited to small tip floats which are restrained in pitch, and not made for the main float where use of the streamlined body as a fuselage would make the scheme much more attractive, indicates that Diehl recognized serious deficiencies in the pitching behavior of streamlined bodies but did not appreciate ability of the external lifting surface to eliminate, or overcome, these deficiencies. A key feature of the present invention is the origination (and proof through model tests) of the idea that unfavorable pitching moments in surface motion of streamlined configurations need not exist when such bodies are used in combination with external lifting surfaces, and that such combinations could be used in applications where freedom to pitch is involved.

Illustration of the invention is given by the following drawings, which show some of the models that have been built and tested prior to use of the invention in production airplanes.

Fig. 1 shows the hydrodynamic lifting surface beneath the streamlined fuselage of a twin engine landplane.

Fig. 2 shows hydrodynamic lifting surfaces beneath the inboard power plant nacelles of an airplane having a streamlined hull.

Fig. 3 shows a hydrodynamic lift device which may be attached at any suitable attitude and location beneath an airplane having a streamlined hull, or fuselage.

In Fig. 1 the lifting surface, 12, is located beneath the forward portion of the fuselage 10. In a landing, the airplane may contact the water either tail first, simultaneously on tail and lifting surface, or may contact on the lifting surface. A small auxiliary lifting surface (not shown) may be located at the tail to avoid suction forces at the tail, but this will not be necessary for most airplanes.

The lifting surface, 12, is important in the prevention of dangerous skipping in which the rear of a streamlined fuselage is sucked into the water violently enough to cause a rapid increase of trim, resulting in a build-up of wing lift and hydrodynamic lift which causes the airplane to leave the water in an uncontrollable attitude. The lifting surface is also important in restraining the airplane to reasonable penetrations and resistance forces, and in preventing violent diving which occurs when the suction force on a streamlined fuselage passes forward of the center of gravity.

The lifting surface prevents dangerous skipping through its effects in decreasing areas of the fuselage which are submerged at high speed, increasing trims which are associated with given wetted areas, and disturbing flow about the rear of the fuselage. The position of the lifting surface restricts immersion of the fuselage alone to greatly reduced wetted lengths, and immersion of the lifting surface reduces immersion of the fuselage in flow behind the lifting surface by raising the center of gravity of the airplane and depressing the water behind the lifting surface. These effects also increase the minimum trim associated with a given wetted length. Thus reductions in suction force, and moments causing skipping, due to reduction of wetted area are supplemented by the effects of increased trim in causing downwash in opposition to upwash caused by suction forces on the convex shape of the streamlined fuselage, and by moment changes due to increase of drag forces and their moment arms in opposition to moments caused by suction forces on the tail. Disturbance of the flow at the fuselage by previous passage of the lifting surface adds to area and trim effects in giving drag moments which oppose skipping, and, due to partial ventilation of the flow, gives further reduction of suction forces.

The lifting surface is very effective in the elimination of large resistance forces which would otherwise occur for the streamlined fuselage alone. This is because the lifting surface acts in direct support of the airplane, whereas the streamlined fuselage alone has maximum suction forces at low trims and must sink to large wetted areas in order to obtain buoyancy sufficient to both overcome the large suction forces and support the airplane. Elimination of diving moment due to large resistance force acting beneath the center of gravity of the airplane, and large buoyancy with its resultant force rearward of the center of gravity, is very important in that these moments may easily overpower opposing moment which, although the suction force is large, is reduced in magnitude because of reduction in moment arm associated with forward travel of the resultant suction force at low trims. When such overpowering occurs the airplane rotates to negative trim, the resultant suction force passes forward of the center of gravity, and a violent dive occurs. Addition of the lifting surface provides a positive nose-up moment and greatly reduces resistance forces and nose-down moments. A positive margin is provided for dissipating nose-down angular velocity which occurs in tail contacts at high sinking speed and in rough water. If such an impact is severe enough to cause rotation to negative trim, the lifting surface continues its dissipation of angular velocity, supplies a positive lift, and prevents violent diving which would otherwise occur.

Actions of the lifting surface in Fig. 1 also occur for the lifting surfaces in Fig. 2, except that lateral displacement of the surfaces from the fuselage or body portion eliminates effects associated with operation of the rear of the fuselage in flow which has been disturbed by the lifting surface. The lateral displacement of the lifting surfaces gives stability in roll which is not present for some wing designs, and the more rearward location of the lifting surfaces as compared with Fig. 1 gives increased lifting efficiency at the expense of reduced stabilizing moments in pitch. The lifting surfaces in Fig. 2 and that in Fig. 1 may be superposed on the same airplane to give support similar to that of a tricycle landing gear. In that case the two rear surfaces would probably be arranged so that their resultant force passes slightly rearward of the center of gravity of the airplane.

Fig. 3 shows a lifting surface and trusswork which may be used to attach it beneath an airplane at various longitudinal, lateral, and vertical positions, and at various angles of incidence. Unlike Figs. 1 and 2, a large gap may exist beneath the airplane and the lifting surfaces. The most forward location and the most rearward location of the resultant forces on the surfaces may be a long distance ahead of the center of gravity of the airplane, but the most rearward position cannot be more than a short distance behind the center of gravity. Even when only one lifting surface is used, it may extend rearward and downward sufficiently to insure initial contact on it and prevent contacts on the tail of the fuselage.

The lifting surface in Fig. 3 should be regarded as a simplified model. More refined models may incorporate dihedral of the lower surface to reduce impact loads, and streamlining of struts, edges of the model, and the upper surface in order to reduce drag.

As shown, Fig. 3 includes a portion of the under body 10 of the aircraft and a recess or hatch 11 for housing conventional hydraulic retraction gear which is attached to the hydroflap 12 by supporting extensible members 13. The hydroflap 12 has a low aspect ratio. For example, its length relative to the span may be in the ratio of 5 to 1.

Its relatively small size as compared with buoyant structures such as floats is apparent. Its action as fully set forth does not depend to any substantial extent on buoyancy but rather to its angle of incident or to its shape. These non-buoyant members or flaps may be constructed of any suitable material of suitable strength including metals. It is of course advantageous that the lighter weight and non-corrosive metals be selected so as to reduce the overall weight of the airplane.

The lifting surface may vary greatly in size. Small surfaces will usually be put at high angles of incidence in order to have maximum effect in overcoming adverse lift and moments of the streamlined fuselage. Larger surfaces operating at medium angles of incidence may be used to supply the necessary lift with reduction of resistance and diving moment due to drag of the surface. Further lowering of resistance and diving moment may be attained by decreasing the length beam ratio, even to the extent that the lifting surface becomes a high aspect ratio plate or hydrofoil. Such surfaces, however, are conductive to instability in that they develop their high efficiency at small angles, are very sensitive to changes in trim and direction of motion, are insensitive to draft when submerged, and are inherently unstable when upper surface lift in submerged motion causes rise to the water surface at speeds and attitudes for which planing lift is not sufficient to prevent submergence. When these adverse characteristics are combined with the adverse characteristics of a streamlined fuselage, special means, such as large dihedral and large trim change at lift-out may be required in order to retain stability.

In the interest of obtaining optimum performance, different forms of the lifting surfaces may be used at different longitudinal stations. Special forms such as T-shapes and cambered shapes may be used, the lifting surface may deform under load through various schemes of inflation and mechanical or structural deformation, and the surface may be flexibly connected to the fuselage in many ways. Such details of construction might be the subject of further improvements, and are capable of more general application than the specific case described herein.

The hull, or fuselage, below which the lifting surfaces are attached, may be completely streamlined as in Figs. 1 and 2, and in any case, will have transverse sections of which a significant portion are significantly streamlined in comparison with seaplanes which do not have external lifting surfaces. This provides a clear distinction from prior application of lifting surfaces to seaplane hulls, which has not involved any streamlining of the chines with addition of the lifting surfaces.

As will be understood conventional seaplane hulls comprise a keel, chines and a step or steps. The present improvements in providing for the practical use of seaplane hulls in which material or large portions are effectively streamlined is believed to involve a considerable and important improvement in the art.

The invention has been described in connection with the illustrated embodiment but is not limited thereto. It is desired to be restricted only by the scope of the appended claims.

The invention described and claimed herein may be manufactured and used by or for the Government of the United States of America for governmental purposes without the payment of any royalties thereon or therefor.

I claim:

1. An airplane having a streamlined and buoyant body portion which provides a supporting surface for the airplane at rest in water, a plurality of low aspect ratio means each of which is spaced from said body portion at a high angle of incidence and has a surface which provides hydrodynamic lift, said plurality of means being relatively small and non-buoyant and being positioned so that their resultant lift force will be well forward of the center of gravity of the airplane, and means extending downwardly from the aircraft for supporting each of the said plurality of means.

2. An airplane having a streamlined and buoyant hull which provides a supporting surface for the airplane at rest in water and hydrodynamic lift while moving through water, substantially non-buoyant retractable means, means for supporting said non-buoyant retractable means substantially within the outline of the hull during flight, said supporting means being movable to extend the retractable means to a position spaced from the hull, said retractable means being of single structure of low aspect ratio and having surfaces which provide additional hydrodynamic lift when the retractable means is in extended position below the hull, said surfaces being forwardly of the center of gravity of the airplane.

3. The combination of claim 2 further defined in that there are a plurality of separate retractable means whose resultant force is forwardly of the center of gravity.

References Cited in the file of this patent

UNITED STATES PATENTS

| Number | Name | Date |
| --- | --- | --- |
| 1,200,259 | Steinmetz | Oct. 3, 1916 |
| 1,423,610 | Hayes | July 25, 1922 |
| 2,215,598 | Sznycer | Sept. 24, 1940 |

FOREIGN PATENTS

| Number | Country | Date |
| --- | --- | --- |
| 132,878 | Great Britain | Sept. 25, 1919 |
| 306,115 | Italy | Feb. 25, 1933 |
| 320,963 | Italy | Sept. 17, 1934 |